July 30, 1963 J. H. JACQUIER 3,099,716

DIVERSITY COMMUNICATION SYSTEM

Filed June 30, 1961 2 Sheets-Sheet 1

INVENTOR
J. H. JACQUIER
BY R. B. Ardis
ATTORNEY

INVENTOR
J. H. JACQUIER
BY R. B. Anderson
ATTORNEY

United States Patent Office 3,099,716
Patented July 30, 1963

3,099,716
DIVERSITY COMMUNICATION SYSTEM

Jean H. Jacquier, Madison, N.J., assignor to Bell Telephone Laboratories, Incorporated, New York, N.Y., a corporation of New York Filed June 30, 1961, Ser. No. 121,193
6 Claims. (Cl. 179—15)

This invention relates to diversity communication systems and more particularly, although in its broader aspects not exclusively, to multiplexed telephone facilities utilizing "path diversity" to provide improved reliability.

In order to increase reliability by means of path diversity, an information carrying signal is transmitted simultaneously over a plurality of independent paths. If noise bursts or signal "quietings" occur on different paths in a more or less incoherent manner, the probability that the signal will be correctly transmitted over at least one of the paths at a given time is considerably better than the probability of correct transmission on any one path taken singly. To insure maximum reliability of transmission, it is desirable that a given noise burst or equipment failure should not affect more than one path. In a telephone plant, an excellent degree of diversity is readily attainable by using entirely different routings for the several paths. If a highly reliable communication link is desired between New York and Denver, for example, one path might be routed through Chicago by means of cable facilities while the other path might well comprise microwave facilities passing through New Orleans.

At the receiving terminal of a path diversity system, it is common practice to provide means for combining the signals, usually by an adding process, while eliminating or reducing in amplitude any signal arriving on a disturbed path. Those combining techniques which have been previously suggested, however, although satisfactory in other applications, possess significant disadvantages when used in connection with transmission facilities of the type commonly used in a telephone plant. The noise bursts or signal "quietings" which occur on telephone facilities have different characteristics from those which are commonly encountered at the output of conventional radio communication systems, for example. Furthermore, because because of the need to obtain substantial path diversity, the telephone facilities selected for the paths might well possess significant differences with respect to method of transmission, path lengths, transmission loss, and the like. In a telephone diversity system the required combining apparatus must therefore be able to combine signals having quite dissimilar phase and amplitude characteristics, and, quite likely, also having slightly different frequencies.

It is, therefore, a principal object of the present invention to utilize path diversity for improving the reliability of transmission over multiplexed telephone facilities.

A still further object of the invention is to protect against the transmission failures which would ordinarily result from those types of momentary equipment failures and noise bursts which are characteristic of some telephone transmission facilities.

A further object of the present invention is to combine signals arriving over diverse transmission paths in a simplified though highly effective manner.

A more particular object of the present invention is to provide coherent voltage addition of a plurality of wide band signals, each of which has been transmitted over independent facilities, even though the signals may exhibit significant differences in phase, amplitude and frequency.

In a principal aspect the present invention takes the form of a diversity communication system which utilizes multiplexed transmission facilities in each of several transmission paths. In accordance with this aspect of the invention a supervisory pilot signal is transmitted collaterally with the information carrying signals. At the receiving terminal of the system means associated with each path are employed for adjusting the phase, amplitude and frequency of the signals arriving on each of the paths to substantial conformity with one another.

In accordance with a principal feature of the present invention logic circuitry and means for achieving instantaneous switching are provided for excluding from the recombination of signals the signal from any path which exhibits a noise level in excess of a particular value or a signal transmission level outside a predetermined range. In this regard, means associated with each transmission path are employed to develop a first voltage whose amplitude is related to the instantaneous magnitude of noise on that path and a second voltage whose amplitude is related to the instantaneous amplitude of the collaterally transmitted pilot signal received on that path. Similarly, means are also employed for developing a third voltage whose amplitude is related to the phase difference of the signals being received. Logic circuitry responsive to the aforementioned voltages together with delay means are employed for excluding from the recombination of signals any signal being received on a disturbed path before the disturbance arrives at the point of recombination. In accordance with an additional feature in the invention means are provided for preventing all of the incoming signals from being excluded simultaneously.

A more complete understanding of the invention may be obtained from a study of the following detailed description of a specific embodiment of the invention.

Figure 1:
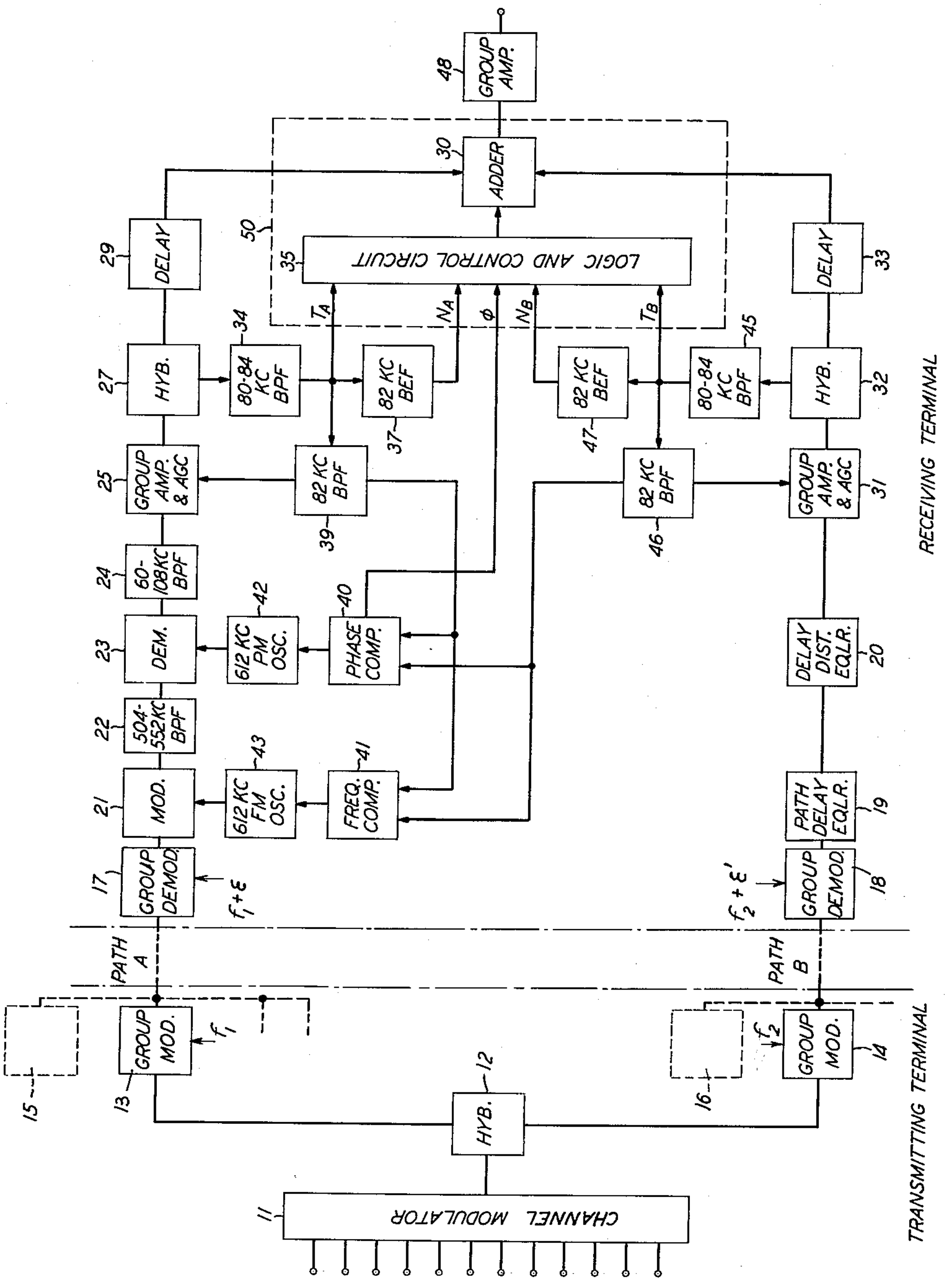
FIG. 1 is a block diagram of a diversity communication system utilizing multiplexed facilities as contemplated by the invention.

As shown in FIG. 1 of the drawings, a channel modulator 11 is equipped with twelve separate input terminals. The output of channel modulator 11 is connected to the input of a hybrid network 12. Hybrid network 12 is provided with two outputs, one of which is connected to the input of group modulator 13 and the other to the input of group modulator 14. The output of the group modulator 13, along with the outputs of related group modulators 15, is applied to the input of transmission path A. The output of group modulator 14 and the outputs of the related group modulators 16 are applied to the input of path B.

Each of the twelve input terminals of the channel modulator 11 normally receives one or more audio-frequency information carrying signals. The channel modulator 11, as contemplated by this particular embodiment of the invention, multiplexes the audio-frequency signals applied to the twelve input terminals into a group of signals of higher frequencies. The channel modulator utilizes single-sideband techniques such that the output "group signal" which is produced comprises a series of twelve, single-sideband, suppressed-carrier signals, the carrier frequencies of which are spaced at 4 kilocycle intervals. In this embodiment the signal of highest frequency has a carrier frequency of 108 kilocycles and occupies the lower sideband. This signal, therefore, occupies a channel with a frequency range from 104 to 108 kilocycles. The next lower channel, then, occupies a frequency range from 100 to 104 kilocycles, the next 96 to 100 kilocycles, and so on. The twelfth and lowest frequency channel occupies a frequency range from 60 to 64 kilocycles.

In accordance with one feature of the invention a supervisory pilot tone is inserted into a selected one of the twelve input terminals. As will be seen later, the channel frequency corresponding to the selected input terminal should be chosen near to mid-range frequency of the group signal in order that it will be representative of the transmission characteristics of the majority of the other channels. If, as shown in this embodiment of the invention, a 2 kilocycle audio tone is inserted in the 80 to 84 kilocycle channel, the pilot signal will appear at the output of the channel modulator 11 as a discrete 82 kilocycle signal, since a carrier frequency of 84 kilocycles is used and the lower sideband is selected for transmission.

The output of the channel modulator 11 is connected to the input terminal of hybrid network 12. Hybrid network 12 is a well-known arrangement which allows electrical connection of the output of channel modulator 11 to the inputs of two unlike subsequent transmission circuits, yet prevents electrical interaction between those subsequent circuits. In the telephone plant these subsequent transmission circuits are likely to consist of any number of modulation stages whose purpose is to increase, by means of further frequency staggering, the transmission capacity of each of the two paths. As shown in FIG. 1, by way of example, group modulator 13 raises the frequencies of the group signal from hybrid network 12 to a considerably higher frequency by "modulating" the group signal with frequency $f_1$. The outputs from the related group modulators 15, each of which occupies a different frequency range, are joined with the output of group modulator 13 to form a "super-group" signal which, possibly with other "super-groups," is applied to transmission path A. Group modulator 14 which modulates the group signal from hybrid network 12 with frequency $f_2$ and the group modulators 16 generate in a similar manner a "super-group" signal which, possibly with other "super-groups" is applied to transmission path B.

Path A and path B may be made up of quite dissimilar facilities. Upon reception it is usually necessary to shift downward to their original frequency the frequency of the group signals received over paths A and B. This is accomplished for path A in group demodulator 17 by "beating" the frequency $(f_1+\epsilon)$ with the group signal. $\epsilon$, in this case, represents the small difference in frequency (and, of course, may be either positive or negative) between the carrier signal applied to group modulator 13 for modulating the group signal upward in frequency and the carrier signal applied to demodulator 17 for demodulating the transmitted signal downward in frequency. Similarly group demodulator 18, by means of the frequency $(f_2+\epsilon')$ returns the signal received over path B to its original frequency. $\epsilon'$ then represents the difference in frequency between the carrier signal applied to group modulator 14 and the carrier signal applied to group demodulator 18. Since it is not usually practical for the sources of these beating signals to be frequency-wise interlocked, $\epsilon$ will most likely not be equal to $\epsilon'$. Consequently, the group signal at the output of group demodulator 17 will not, in all probability, be equal to the frequency of the group signal at the output of group demodulator 18.

As shown in FIG. 1 the group signal from path A is passed in sequence through modulator 21, bandpass filter 22, demodulator 23, bandpass filter 24, a group amplifier 25 which is equipped with an automatic gain control, hybrid network 27 and delay network 29 to the input of adder circuit 30. The signal from path B, after being delay-equalized by the path delay equalizer 19 and the delay distortion equalizer 20, is passed in succession through a group amplifier 31 which is also equipped with an automatic gain control, the hybrid network 32 and delay network 33 to the adder circuit 30. A sample of the group signal being received on path A is taken from hybrid network 27 and applied to the input of the 80 to 84 kilocycle bandpass filter 34. The output of filter 34 is connected to the input $T_A$ of logic and control circuit 35, to the input of 82 kilocycle band-elimination filter 37 and to the input of the 82 kilocycle bandpass filter 39. The output of the band-elimination filter 37 is applied to the input $N_A$ of logic and control circuit 35. One output of the bandpass filter 39 is connected to the automatic gain control circuitry of group amplifier 25 while the other output is applied to both phase comparator 40 and frequency comparator 41. One output of phase comparator 40 is applied to the input $\varphi$ of logic and control circuit 35 while the other output is connected to phase modulated oscillator 42. The output of phase modulated oscillator 42 is applied to demodulator 23. The output of frequency comparator 41 is connected to a frequency modulated oscillator 43 whose output is in turn connected to the modulator 21. A sample of the signal on path B is obtained from hybrid network 32 and is then passed in a similar manner through bandpass filter 45 to input $T_B$ of control circuit 35, to the input of bandpass filter 46 and to the input of the 82 kilocycle band elimination 47. The output of band elimination filter 47 is connected to the input $N_B$ of the control circuit 35. The output of bandpass filter 46 is applied to the input of both phase comparator 40 and frequency comparator 41.

The output of logic and control circuit 35 is applied to the adder circuit 30. The operation of that portion of the embodiment of the invention which comprises the logic and control circuit 35 and adder 30 and which is enclosed by the broken line 50 will be discussed in connection with FIG. 2 of the drawings. The output signal from the adder circuit 30 is amplified by group amplifier 48.

The order to bring the signals at any instant into substantial phase coincidence, path delay equalizer 19, a "flat" delay network, is first inserted in the shorter of the two paths. Path delay equalizer 19 exhibits a predetermined delay which is independent of frequency. By way of example, this network, as shown in this embodiment of the invention, has been inserted in path B. To compensate for the differences in the "delay v. frequency" characteristics of the two paths, path delay distortion equalizer 20 is also inserted in path B. Delay distortion equalizer 20 is necessary since the delay characteristics across the frequency range of two group signals which are received through unlike facilities will usually present different shapes.

As discussed earlier, the group signals arriving on path A and path B will most likely not be of identical frequency. It is, therefore, necessary to equalize both the frequency and residual phase unbalances between the two signals before combining them. This is accomplished by first comparing the frequencies of the 82 kilocycle supervisory tones which are obtained from the 82 kilocycle bandpass filters 39 and 46. Frequency comparator 41 develops a direct current voltage which is related to the difference in frequency of the two tones. This direct current voltage is applied to a variable reactance element of the frequency modulated crystal oscillator 43. This oscillator delivers a sinusoidal signal to modulator 21 which has a frequency, in this case, equal to 612 kilocycles plus or minus an incremental frequency difference corresponding to the magnitude of the direct-current voltage appearing at the output of frequency comparator 41. Modulator 21 delivers an output signal to bandpass filter 22 which comprises the sum and difference products of the group signal arriving on path A and the signal from oscillator 43. Bandpass filter 22 eliminates the "sum product" and passes only the "difference product" which, in this case, occupies a frequency range from 504 to 522 kilocycles. Phase comparator 40 which is responsive to the phase difference of the 82 kilocycle supervisory tones delivers a direct-current voltage to the phase modulated oscillator 42. Oscillator 42 delivers a 612 kilocycle signal whose phase at any given time is dependent on the magnitude of the direct-current voltage from phase comparator 40. This phase modulated signal is applied to demodulator 23 which transposes downward in frequency the high frequency group signal passed by filter 22. Bandpass filter 24 then passes the difference product from demodulator 23 to the group amplifier 25. As a result of this process both the phase and frequency of the path A signal applied to group amplifier 25 and the path B signal applied to group amplifier 34 are substantially coherent.

In order to correct for a possible amplitude unbalance between the two received "group signals" before combining them, automatic gain controls 25 and 31 are inserted in the paths A and B, respectively. These two gain controls are associated with group amplifiers and are each regulated by the amplitude of the 82 kilocycle pilot tone received in each path. Such pilot-regulated amplifiers commonly utilize thermistors in a feedback network and are capable of delivering a nearly constant output signal as long as the signal delivered to its input lies within a given range of values.

After passing through the above-described circuits, the adder circuit 30 receives two discrete diversity inputs of similar phase amplitude and frequency, and derives a single output signal. This output may be constructed from either one or both inputs, depending on the status and condition of each of the input signals. In the event of a transmission disturbance on one path, the logic and control circuit 35 automatically switches the disturbed input Off for the duration of the disruption. In the event of disruptions on both inputs, a single input is locked On until one input becomes normal, and the output is then automatically switched to the normal input, if switching is necessary.

The logic and control circuit 35, controls the adder circuit 30. The output signal from the adder 30 is amplified by group amplifier 48. The logic and control circuit 35 employs peak detecting rectifiers, analog-to-digital converters, and logic and control circuitry. Logic decisions are accomplished digitally, and direct operations of the gating control stage in response to five inputs. Two of these, $T_A$ and $T_B$, represent the magnitude of the pilot signal received from the respective paths. Two others $N_A$ and $N_B$, represent the power of the noise components existing in the supervisory channels of paths A and B, respectively, as obtained at the output of the 82 kilocycle band elimination filters 37 and 47. The fifth input $\varphi$ to the logic circuit 35 is delivered by the phase comparator 40 and is a direct-current voltage related to the phase difference of the signals arriving from the separate paths.

Figure 2:
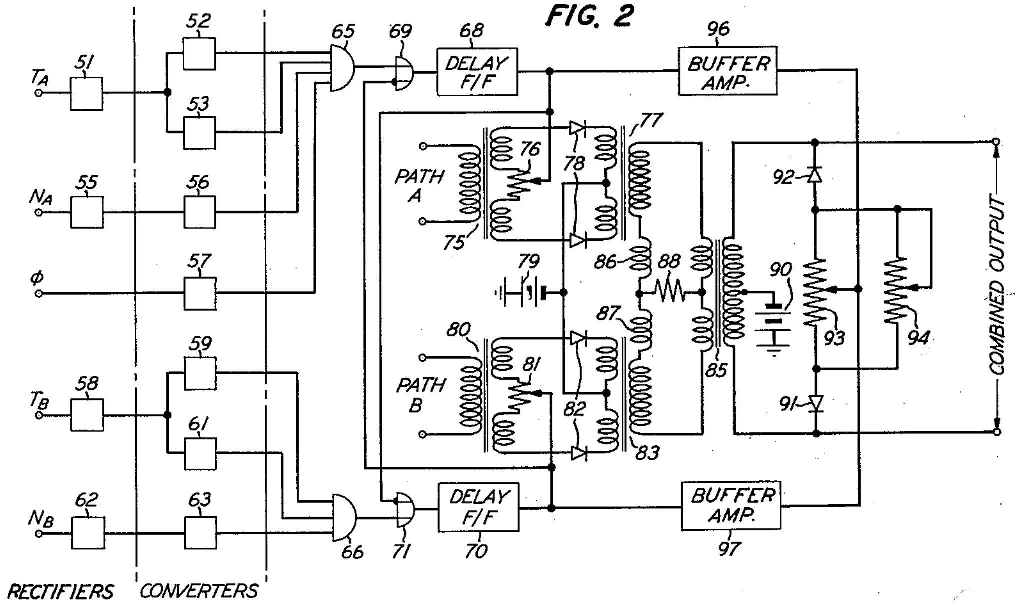
FIG. 2 illustrates in more detail the logic, control and adder circuitry which forms a portion of the system diagrammed in FIG. 1.

As shown in FIG. 2 which shows in more detail the circuits enclosed by the broken line 50 of FIG. 1, the logic and control circuit 35 receives five analog inputs which comprise noise and tone signals from both paths A and B and a direct-current signal indicative of the phase difference between path A and path B. The 82 kilocycle tone signal from path A after filtering in filter 34 is applied to initiator rectifier 51 whose output is connected to the input of converters 52 and 53. The noise signal from path A, after passing through the 82 kilocycle band-elimination filter 37, is applied to initiator rectifier 55, whose output is connected to the input of converter 56. The direct-current phase-difference signal from phase comparator 40 is applied directly to converter 57. The tone signal from path B after filtering in filter 45 is applied to the input of initiator rectifier 58 whose output is connected to the inputs of converters 59 and 61. The noise signal from path B after passing through the 82 kilocycle band-elimination filter 47 is applied to the input of initiator rectifier 62 whose output is connected to the input of converter 63. The outputs of converters 52, 53, 56 and 57 are applied to the four input terminals of AND gate 65 while the outputs of converters 59, 61 and 63 are applied to the three inputs of AND gate 66. The output of AND gate 65 is connected to the input of a delay flip-flop network 68 by means of INHIBIT gate 69. Similarly, the output of AND gate 66 is applied to delay flip-flop 70 by means of INHIBIT gate 71. The inhibit input of gate 69 is cross-connected to the output of delay flip-flop 70 while the inhibit input of gate 71 is connected to the output of delay flip-flop 68.

The group signal from path A obtained from the delay network 29 whose purpose is described later, is applied to the primary winding of transformer 75; transformer 75 is equipped with a "double secondary." Potentiometer 76 is connected across the center terminals of the double secondary such that the movable tap of potentiometer 76 forms an adjustable center-tap connection. The terminals of the secondary of transformer 75 are connected to the primary winding of transformer 77 by means of diodes 78. The primary winding of transformer 77 is equipped with a center-tap which is connected to the negative terminal of battery 79. The two diodes 78 are polarized to allow positive current flow from the adjustable center-tap of the secondary of transformer 75 to the negative terminal of battery 79 whose positive terminal is grounded. The output terminal of delay flip-flop 68 is connected to the movable arm of potentiometer 76. An identical arrangement for path B is made up of transformer 80, potentiometer 81, diodes 82 and the primary winding of transformer 83. The center-tap of the primary winding of transformer 83 is also connected to the negative terminal of battery 79. Both the secondaries of transformer 77 and transformer 83 are connected to opposite sides of a balancing network which is made up of primary winding of transformer 85, inductances 86 and 87 and resistance 88. The secondary of transformer 85 is equipped with a center-tap connected to the negative terminal of battery 90.

The terminals of the secondary of transformer 85 provide the combined output. A loss compensation network is connected across the secondary terminals of transformer 85. This network is made up of diodes 91 and 92 and potentiometers 93 and 94. The terminals of potentiometer 93 are connected to each of the terminals of the secondary of transformer 85 by means of diodes 91 and 92, respectively. The movable tap of potentiometer 93 is connected to the output of the buffer amplifiers 96 and 97. The input of the buffer amplifier 96 is connected to the output of delay flip-flop 68. Similarly, the input of buffer amplifier 97 is connected to the output of delay flip-flop 70. Diodes 91 and 92 are polarized such that they will allow positive current flow from the movable arm of potentiometer 93 to the negative terminal of battery 90. Potentiometer 94 is connected in parallel with potentiometer 93 and, since its movable tap is directly connected to one end, forms a variable resistance.

Figure 3:
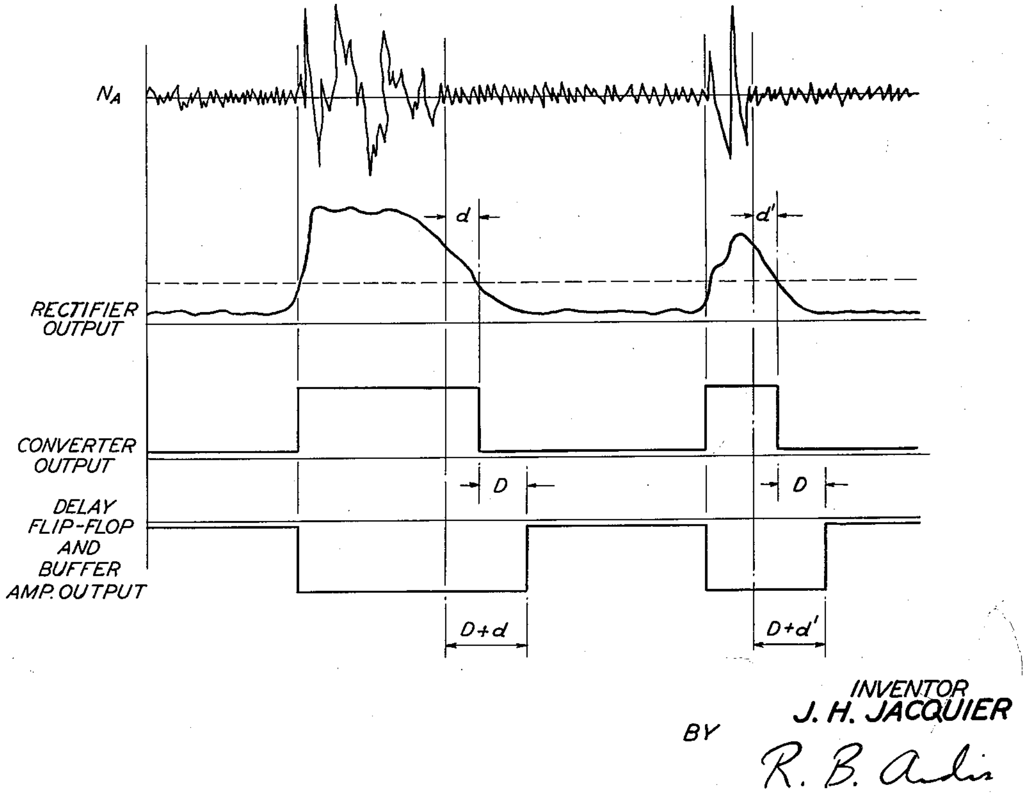
FIG. 3 illustrates several wave forms which are useful in describing the operation of the invention.

In order to understand the operation of the logic and control circuit it will be helpful to consider the wave forms shown in FIG. 3 of the drawings. The upper wave form of FIG. 3, by way of example, represents a noise burst in path A reaching the initiator rectifier 55. Initiator rectifier 55 like rectifiers 51, 58 and 62 is a fast-response peak-detecting device. Its output is characterized by the second wave form of FIG. 3, which has a longer time duration than that of the originating noise burst because of the action of the peak detector. The resulting wave form is then applied to the analog-to-digital converter 56 which, like converters 52, 57, 59 and 63, is a threshold type device such as a Schmitt trigger. Such a device delivers an output voltage if, and only if, the input voltage exceeds a predetermined threshold level. Converters 53 and 61 are similar devices which deliver an output only if their input voltage falls below a predetermined threshold level. Converter 56, which is responsive to the output of rectifier 55, delivers an output which is illustrated by the third line of FIG. 3. "AND" gate 65 like "AND" gate 66 delivers an ouput whenever any one of its four input terminals is energized. The output of AND gate 65 is applied to the input of delay flip-flop 68 by means of the inhibit gate 69. Inhibit gate 69, also a commonly known device, passes the output from AND gate 65 freely unless its inhibit input is energized. Delay flip-flop 68 is a "fast-on, delayed-off" device well known in the art whose operation is illustrated by the bottom line of FIG. 3.

Since the voltage from delay flip-flop 68, which is applied to the movable tap of potentiometer 76, is normally near zero potential, diodes 78 are normally forward-biased allowing the signal from path A to be passed to the output terminals. Whenever the delay flip-flop 68 delivers a negative-going output, diodes 78 are back-biased, consequently cutting off the signal from path A. Proper adjustment of the center-tap connections on potentiometer 76, prevents switching transients from inducing disturbances in either the primary of transformer 75 or the secondary of transformer 77.

A noise burst occurring on path A, therefore, will cause path A to be switched off (provided path B is not already off) for a time duration exceeding the total duration of the noise by the amount $D+d$ shown for the first noise burst in the bottom line of FIG. 3, and by the amount $D+d'$ shown for the second noise burst. By means of the delay network 29 shown in FIG. 1 such noise bursts may be approximately centered in the off-time region. For this purpose delay network 29 would be adjusted under ideal conditions to have a total delay equal to $$\frac{D+\bar{d}}{2}$$

plus the finite switching time of the network. The quantity $\bar{d}$ in this case, is the average time delay occurring due to the finite bandwidth of the rectifiers.

Whenever the signal from one of the paths is switched out, the combined output would normally exhibit a substantial drop in amplitude. To prevent this effect from deleteriously affecting the output signal, a loss compensation network comprising buffer amplifiers 96 and 97, potentiometers 93 and 94, and diodes 91 and 92 is provided. The output of the buffer amplifiers is similar to the output of the delay flip-flop circuits; consequently, if both paths are switched On, the diodes 91 and 92 are forward-biased. The parallel combination of potentiometers 93 and 94 then act as a resistance shunt or "padding" circuit and provide a 6-decibel attenuation to the output signal. If either path is gated out, the pad is removed since diodes 91 and 92 become back-biased. The removal of the 6-decibel attenuation results in a substantially constant output, independent of whether one of the two input signals is gated out or not. Potentiometer 94 is adjusted to provide a pad as nearly equal to 6 decibels as possible. Potentiometer 93 on the other hand is adjusted to provide the balance necessary to prevent switching transients from appearing in the output signal.

Converters 52 and 53 receive from rectifier 51 an analog voltage whose magnitude is related to the magnitude of the supervisory tone being received on path A. Two converters are used in order to provide signal switching when the magnitude of this tone rises above or falls below a given range of values. To accomplish this, converter 52 is used to provide the upper threshold while converter 53 provides the lower. Converters 59 and 61 in combination with rectifier 58 provide a similar feature for path B. The operation of rectifier 62 and converter 63 is analogous to the operation of rectifier 55 and converter 56. Since a direct-current voltage related to the phase difference of the signals from paths A and B may be directly obtained from the phase comparator 40 shown in FIG. 1, additional circuitry is not required. This direct-current voltage is converted into an error signal by means of converter 57 whenever the absolute value of the phase difference between the two received signals exceeds a predetermined value. As shown in FIG. 2, the output of converter 57 is applied to the gating network 65 for path A. It causes the signal from path A to be deleted from the recombination until the phase difference between the received A and B 82 kilocycle pilot tones decreases below, for example, 30 degrees. It avoids thereby sudden and excessive phase jumps in the output signal resulting from an Off switch of either input signal.

As discussed above, the combiner as contemplated by the invention provides a means for achieving a coherent recombination of signals arriving on greatly dissimilar transmission paths. These signals after having been "matched" in phase amplitude and frequency are constructively added together to form the combined output. In accordance with a feature of the invention any received signal which has been disturbed, either by noise, crosstalk, or momentary equipment failure, is entirely deleted from the recombination before the disturbance appears at the point or recombination. The arrangement contemplated by the invention provides a reliable communication system which is especially useful in the transmission of data over multiplex telephone facilities.

It is to be understood that the arrangements which have been described are illustrative of the application of the principles of the invention. Numerous other arrangements may be devised by those skilled in the art without departing from the spirit and scope of the invention.

What is claimed is:

1. In a diversity communication system having transmitting and receiving terminals, said terminals being connected by a plurality of transmission paths, means at said transmitting terminal for transmitting the same signal over each of said paths simultaneously, said signal being comprised of a plurality of information carrying subsignals and a supervisory pilot signal, and means at said receiving terminal for constructively adding like ones of said subsignals which are received on different transmission paths which comprises means for adjusting the phase, amplitude and frequency of the received subsignals such that like subsignals received on different paths are substantially identical, means associated with each of said paths for generating a first electrical quantity whose magnitude is related to the magnitude of noise on that path, means associate with each path for generating a second electrical quantity whose magnitude is directly related to the amplitude of said pilot signal being received on that path, means for forming a sum of like subsignals, means responsive to said first and second electrical quantities for excluding individually from said sum any subsignals being received on a disturbed one of said paths, and means for preventing all of said subsignals from being deleted from said sum simultaneously.

2. A diversity communication system which comprises, in combination, means to transmit a single signal over a plurality of telephone type transmission paths, each of said paths using substantially different transmission facilities from the other, a receiving terminal common to both of said paths, means at said receiving terminal for adjusting the phase, amplitude and frequency of at least one of said signals such that said signals are substantially identical at any instant, means for constructively adding said signals to form a summation, means associated with each of said paths for generating an electrical quantity whenever that path exhibits a transmission disturbance, gating and delay means associated with each of said paths and responsive to said electrical quantity for excluding from said sum the signal arriving on that path before said transmission disturbance appears at said signal adding means, and means to prevent the signals from all of said paths from being excluded from said sum simultaneously.

3. A diversity communications system which comprises, in combination, means to transmit a group of signals over each one of a plurality of paths simultaneously, said group of signals being comprised of a plurality of information carrying subsignals and a supervisory pilot signal, each of said paths comprising telephone transmission facilities geographically routed in a manner unlike any other one of said paths, a receiving terminal common to all of said paths, means at said receiving terminal for altering the phase, amplitude and frequency of the received signals such that like subsignals received over different ones of said paths are susbtantially identical at any instant, means for constructively adding like ones of said subsignals to form a summation, means associated with each of said paths responsive to said supervisory pilot signal received on that path for detecting received disturbances due to transmission deteriorations on that path, means associated with each path for detecting noise disturbances in excess of a predetermined value, gating means for excluding from said summation of received subsignals any subsignals arriving on a path in which a disturbance is detected, delay means for allowing said subsignal to be excluded before said disturbance appears at said gating means, and means for preventing all of said subsignals from being excluded from said summation simultaneously.

4. In a diversity communications system, means at the transmitting end of said system for splitting an information carrying signal into a plurality of separate but substantially identical signal components, means for generating a plurality of substantially identical pilot signals, a plurality of diverse transmission paths, means for transmitting each one of said signal components collaterally with one of said pilot signals over a selected one of said transmission paths, and means at the receiving end for forming a recombination of said signal components which comprises, in combination, means associated with each of said paths to generate a first electrical quantity whose magnitude is directly related to the magnitude of the pilot signal being received on that path, means associated with each of said paths to generate a second electrical quantity whose magnitude is directly related to the intensity of the noise received on that path, gating means responsive to said first electrical quantity for excluding from said recombination the signal components from any one of said paths having an associated pilot signal whose magnitude is less than a predetermined value, gating means responsive to said second electrical quantity for excluding from said recombination the component from any one of said paths which has a noise level greater than a predetermined value, and means for preventing all of said components from being excluded simultaneously.

5. A diversity communication system which comprises, in combination, a source of a plurality of information carrying signals, a source of a supervisory pilot signal, frequency multiplexing means for forming a group signal, said group signal being comprised of said pilot signal and said plurality of information carrying signals and characterized in that each of said information carrying signals occupies a portion of the frequency spectrum different from any other one of said information carrying signals, means to transmit simultaneously said group signal over a plurality of diverse transmission paths, a receiving terminal common to all of said paths, means at said receiving terminal for altering the phase, amplitude and frequency of selected ones of said group signals upon reception such that each one is substantially identical at any instant to the other, means for constructively adding said group signals to form a summation, means associated with each of said paths for generating a first electrical quantity whose magnitude is related to the amplitude of the pilot signal being received on that path, means associated with each of said paths for developing a second electrical quantity whose magnitude is directly related to the intensity of the noise being received on that path, means associated with said selected ones of said paths for developing a third electrical quantity whose magnitude is related to the phase difference between the signals received over said selected paths and the signal being received on a particular one of said paths taken as a reference, means associated with said selected ones of said paths for developing a fourth electrical quantity whose magnitude is related to the frequency difference between the signals received over said selected paths and the signal received on a particular one of said paths taken as reference, gating means responsive to at least part of said electrical quantities for excluding from said summation the group signal from any path in which a transmission disturbance occurs, delay means for allowing said exclusion to be initiated before said disturbance appears at said gating means, and means for preventing all of said group signals from being excluded from said summation at the same time.

6. In a diversity communication system, multiplex transmission means for sending a single group-signal over a plurality of diverse transmission paths simultaneously, said group-signal being comprised of a plurality of subsignals, one of said subsignals being a supervisory pilot signal, a receiving terminal, means at said receiving terminal responsive to the phase, amplitude and frequency of said pilot signals being received on said paths for insuring that all of said group-signals are substantially identical at any instant, means for adding said group-signals to form a summation, means associated with each of said paths for detecting signal disturbances on that path, gating means for excluding from said summation any one of said group-signals which is being received on a path on which a disturbance is detected, delay means for allowing said gating means to initiate exclusion of any one of said group-signals before said disturbance appears at said gating means, means associated with said gating means for preventing the exclusion of group-signals from affecting the amplitude of said summation, and means for preventing all of said group-signals from being excluded simultaneously.

References Cited in the file of this patent

UNITED STATES PATENTS

| | | |
|---|---|---|
| 1,922,059 | Ohl | Aug. 15, 1933 |
| 2,686,256 | Albersheim | Aug. 10, 1954 |